US007657368B2

(12) United States Patent
Weiss et al.

(10) Patent No.: US 7,657,368 B2
(45) Date of Patent: Feb. 2, 2010

(54) SYSTEM AND METHOD FOR LARGE ROUTE DATA HANDLING WITHIN A TELEMATICS COMMUNICATION SYSTEM

(75) Inventors: John P. Weiss, Shelby Township, MI (US); Mark J. Glaza, Warren, MI (US); James J. Piwowarski, Holly, MI (US)

(73) Assignee: General Motors Company, Detroit, MI (US)

( * ) Notice: Subject to any disclaimer, the term of this patent is extended or adjusted under 35 U.S.C. 154(b) by 97 days.

(21) Appl. No.: 10/983,772

(22) Filed: Nov. 8, 2004

(65) Prior Publication Data

US 2006/0100776 A1 May 11, 2006

(51) Int. Cl.
*G06F 19/00* (2006.01)

(52) U.S. Cl. ........................ 701/200; 709/219; 709/216; 348/211.3; 340/995.1

(58) Field of Classification Search ................. 701/200, 701/210, 209, 214, 202, 201; 340/995.19, 340/995.1; 709/200, 219, 216; 348/211.3
See application file for complete search history.

(56) References Cited

U.S. PATENT DOCUMENTS 6,845,322 B1 * 1/2005 Chao et al. .................. 701/209
2003/1023681 * 12/2003 Bruner et al. ............... 709/200
2004/0030495 A1 * 2/2004 Draeger et al. .............. 701/209
2004/0039523 A1 * 2/2004 Kainuma et al. ............ 701/208
2004/0102899 A1 * 5/2004 Kaji et al. .................... 701/210
2004/0225436 A1 * 11/2004 Yoshihashi .................. 701/208
2004/0254975 A1 * 12/2004 Teh et al. .................... 709/200
2005/0033511 A1 * 2/2005 Pechatnikov et al. ........ 701/210

* cited by examiner

*Primary Examiner*—Tuan C. To

(57) ABSTRACT

The present invention provides a method of operating a telematics enabled mobile vehicle communication system. The method includes receiving a navigation request at a service provider from a telematics unit. The navigation request includes current location information of the telematics unit, destination information, and telematics unit memory capacity information. The method further includes producing navigation instructions based on the received navigation request. The navigation instructions provide directions from the current location of the telematics unit to the destination. The navigation instructions include a plurality of data elements describing the navigation instructions. The amount of data elements included within the navigation instructions is associated with the received telematics unit memory capacity information. The method additionally includes communicating the produced navigation instructions to the telematics unit. The method may further include providing the produced navigation instructions to a user interface.

6 Claims, 3 Drawing Sheets

SYSTEM AND METHOD FOR LARGE ROUTE DATA HANDLING WITHIN A TELEMATICS COMMUNICATION SYSTEM

FIELD OF THE INVENTION

This invention relates generally to wireless communications. More specifically, the invention relates to a method and system for operating a telematics enabled mobile vehicle communication system.

BACKGROUND OF THE INVENTION

The opportunity to utilize wireless features is ever increasing as cellular transceivers are being transformed into entertainment as well as communication platforms. One such cellular transceiver is a wireless feature included within wireless vehicle communication and networking services for a mobile vehicle. Another such cellular transceiver includes capabilities to receive satellite broadcasts such as, for example, Global Positioning System (GPS) signals and satellite radio signals.

Typically, wireless systems within mobile vehicles (e.g., telematics units) provide voice communication. These wireless systems have also been utilized to update systems within telematics units such as, for example, radio station presets. Additionally, these wireless systems have been utilized to send data to service providers. For example, sensor data may be sent to assist the mobile vehicle manufacturer in maintaining the mobile vehicle. Another use for such wireless systems includes navigation assistance that incorporates aspects of an on-board GPS system.

Unfortunately, most conventional navigation assistance systems employ programming that is designed to work with rigid system requirements, such as specific memory requirements. Improvements/upgrades to the programming in these systems often alienates legacy hardware configurations due to new stringent memory requirements. Often, system failures occur during operation of said legacy systems operating with improved/upgraded programming.

The present invention advances the state of the art for operating a telematics enabled mobile vehicle communication system.

SUMMARY OF THE INVENTION

One aspect of the invention includes a method of operating a telematics enabled mobile vehicle communication system. The method includes receiving a navigation request at a service provider from a telematics unit. The navigation request includes current location information of the telematics unit, destination information, and telematics unit memory capacity information. The method further includes producing navigation instructions based on the received navigation request. The navigation instructions provide directions from the current location of the telematics unit to the destination. The navigation instructions include a plurality of data elements describing the navigation instructions. The amount of data elements included within the navigation instructions is associated with the received telematics unit memory capacity information. The method additionally includes communicating the produced navigation instructions to the telematics unit.

In accordance with another aspect of the invention, a computer readable medium storing a computer program for operating a telematics enabled mobile vehicle communication system includes: computer readable code for providing a navigation request received at a service provider from a telematics unit, the navigation request including current location information of the telematics unit, destination information, and telematics unit memory capacity information; computer readable code for producing navigation instructions based on the received navigation request, the navigation instructions providing directions from the current location of the telematics unit to the destination, the navigation instructions including a plurality of data elements describing the navigation instructions wherein the amount of data elements included within the navigation instructions is associated with the received telematics unit memory capacity information; and computer readable code for communicating the produced navigation instructions to the telematics unit.

In accordance with yet another aspect of the invention, a telematics enabled mobile vehicle communication system is provided. The system includes means for receiving a navigation request at a service provider from a telematics unit. The navigation request includes current location information of the telematics unit, destination information, and telematics unit memory capacity information. The system additionally includes means for producing navigation instructions based on the received navigation request. The navigation instructions provide directions from the current location of the telematics unit to the destination. The navigation instructions include a plurality of data elements describing the navigation instructions. The amount of data elements included within the navigation instructions is associated with the received telematics unit memory capacity information. Means for communicating the produced navigation instructions to the telematics unit is also provided.

The aforementioned and other features and advantages of the invention will become further apparent from the following detailed description of the presently preferred embodiments, read in conjunction with the accompanying drawings. The drawings are not drawn to scale. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
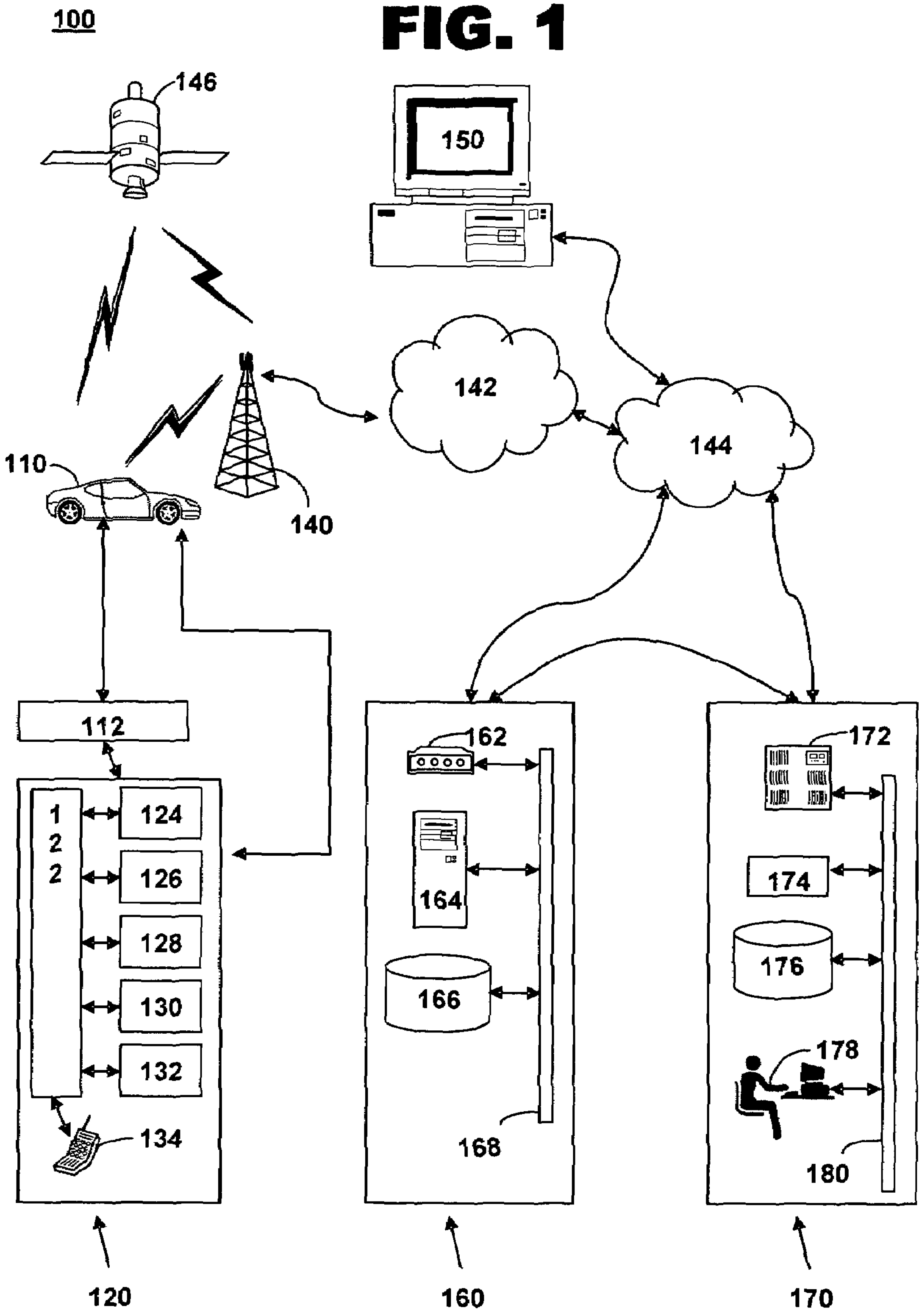
FIG. 1 illustrates an operating environment for implementing wireless communication within a mobile vehicle communication system.

FIG. 1 illustrates one embodiment of an operating environment for implementing wireless communication within a mobile vehicle communication system, in accordance with the present invention at 100. Mobile vehicle communication system (MVCS) 100 includes a mobile vehicle communication unit (MVCU) 110, a vehicle communication network 112, a telematics unit 120, one or more wireless carrier systems 140, one or more communication networks 142, one or more land networks 144, one or more satellite broadcast systems 146, one or more client, personal, or user computers 150, one or more web-hosting portals 160, and one or more call centers 170. In one embodiment, MVCU 110 is implemented as a mobile vehicle equipped with suitable hardware and software for transmitting and receiving voice and data communications. MVCS 100 may include additional components not relevant to the present discussion. Mobile vehicle communication systems and telematics units are known in the art.

MVCU 110 is referred to as a mobile vehicle in the discussion below. In operation, MVCU 110 may be implemented as a motor vehicle, a marine vehicle, or as an aircraft. MVCU 110 may include additional components not relevant to the present discussion.

MVCU 110, via a vehicle communication network 112, sends signals to various units of equipment and systems (detailed below) within MVCU 110 to perform various functions such as unlocking a door, opening the trunk, setting personal comfort settings, and calling from telematics unit 120. In facilitating interactions among the various communication and electronic modules, vehicle communication network 112 utilizes network interfaces such as controller-area network (CAN), International Organization for Standardization (ISO) Standard 9141, ISO Standard 11898 for high-speed applications, ISO Standard 11519 for lower speed applications, and Society of Automotive Engineers (SAE) Standard J1850 for high-speed and lower speed applications.

MVCU 110, via telematics unit 120, sends to and receives radio transmissions from wireless carrier system 140. Wireless carrier system 140 is implemented as any suitable system for transmitting a signal from MVCU 110 to communication network 142.

Telematics unit 120 includes a processor 122 connected to a wireless modem 124, a global positioning system (GPS) unit 126, an in-vehicle memory 128, a microphone 130, one or more speakers 132, and an embedded or in vehicle mobile phone 134. In other embodiments, telematics unit 120 may be implemented without one or more of the above listed components such as, for example, speakers 132. Telematics unit 120 may include additional components not relevant to the present discussion.

In one embodiment, processor 122 is implemented as a microcontroller, controller, digital signal processor (DSP), host processor, or vehicle communications processor. In an example, processor 122 is implemented as an application specific integrated circuit (ASIC). In another embodiment, processor 122 is implemented as a processor working in conjunction with a central processing unit (CPU) performing the function of a general purpose processor. GPS unit 126 provides longitude and latitude coordinates of the vehicle responsive to a GPS broadcast signal received from one or more GPS satellite broadcast systems (not shown). GPS unit 126 additionally provides time information based on the received GPS broadcast signal received from one or more GPS satellite broadcast systems (not shown). In-vehicle mobile phone 134 is a cellular-type phone such as, for example, a digital, dual-mode (e.g., analog and digital), dual-band, multi-mode, or multi-band cellular phone.

Processor 122 executes various computer programs that control programming and operational modes of electronic and mechanical systems within MVCU 110. Processor 122 controls communications (e.g., call signals) between telematics unit 120, wireless carrier system 140, and call center 170. Additionally, processor 122 controls reception of communications from satellite broadcast system 146. In one embodiment, a voice-recognition application is installed in processor 122 that can translate human voice input through microphone 130 to digital signals. Processor 122 generates and accepts digital signals transmitted between telematics unit 120 and a vehicle communication network 112 that is connected to various electronic modules in the vehicle. In one embodiment, these digital signals activate the programming mode and operation modes, as well as provide for data transfers such as, for example, data over voice channel communication. In this embodiment, signals from processor 122 are translated into voice messages and sent out through speaker 132.

Wireless carrier system 140 is a wireless communications carrier or a mobile telephone system and transmits to and receives signals from one or more MVCU 110. Wireless carrier system 140 incorporates any type of telecommunications in which electromagnetic waves carry signal over part of or the entire communication path. In one embodiment, wireless carrier system 140 is implemented as any type of broadcast communication in addition to satellite broadcast system 146. In another embodiment, wireless carrier system 140 provides broadcast communication to satellite broadcast system 146 for download to MVCU 110. In an example, wireless carrier system 140 connects communication network 142 to land network 144 directly. In another example, wireless carrier system 140 connects communication network 142 to land network 144 indirectly via satellite broadcast system 146.

Satellite broadcast system 146 transmits radio signals to telematics unit 120 within MVCU 110. In one embodiment, satellite broadcast system 146 may broadcast over a spectrum in the "S" band (2.3 GHz) that has been allocated by the U.S. Federal Communications Commission (FCC) for nationwide broadcasting of satellite-based Digital Audio Radio Service (DARS).

In operation, broadcast services provided by satellite broadcast system 146 are received by telematics unit 120 located within MVCU 110. In one embodiment, broadcast services include various formatted programs based on a package subscription obtained by the user and managed by telematics unit 120. In another embodiment, broadcast services include various formatted data packets based on a package subscription obtained by the user and managed by call center 170. In yet another embodiment, broadcast services include various generically formatted data packets regularly transmitted by satellite broadcast system 146. In an example, generically formatted data packets such as, for example, pseudo-random code received by telematics unit 120, are processed by processor 122. In this example, pseudo-random code received by telematics unit 120 is processed into GPS coordinates by processor 122, such as by trilateration, and provided to telematics unit 120.

Communication network 142 includes services from one or more mobile telephone switching offices and wireless networks. Communication network 142 connects wireless carrier system 140 to land network 144. Communication network 142 is implemented as any suitable system or collection of systems for connecting wireless carrier system 140 to MVCU 110 and land network 144.

Land network 144 connects communication network 142 to client computer 150, web-hosting portal 160, and call center 170. In one embodiment, land network 144 is a public-switched telephone network (PSTN). In another embodiment, land network 144 is implemented as an Internet protocol (IP) network. In other embodiments, land network 144 is implemented as a wired network, an optical network, a fiber network, other wireless networks, or any combination thereof. Land network 144 is connected to one or more landline telephones. Communication network 142 and land network 144 connect wireless carrier system 140 to web-hosting portal 160 and call center 170.

Client, personal, or user computer 150 includes a computer usable medium to execute Internet browser and Internet-access computer programs for sending and receiving data over land network 144 and, optionally, wired or wireless communication networks 142 to web-hosting portal 160. Personal or client computer 150 sends user preferences to web-hosting portal 160 through a web-page interface using communication standards such as hypertext transport protocol (HTTP), and transport-control protocol and Internet protocol (TCP/IP). In one embodiment, the data includes directives to change certain programming and operational modes of electronic and mechanical systems within MVCU 110.

In operation, a client utilizes computer 150 to initiate setting or re-setting of user preferences for MVCU 110. In one embodiment, a client utilizes computer 150 to provide radio station presets as user preferences for MVCU 110. In an example, user-preference data from client-side software is transmitted to server-side software of web-hosting portal 160. In this example, user-preference data is stored at web-hosting portal 160. In another example, user-preference data from client-side software is transmitted to server-side software of web-hosting portal 160. In this example, user-preference data is stored at web-hosting portal 160 and later transmitted to MVCU 110 via wireless carrier system 140 or satellite broadcast system 146. In another example, user-preference data is transmitted directly to MVCU 110 via wireless carrier system 140 or satellite broadcast system 146.

Web-hosting portal 160 includes one or more data modems 162, one or more web servers 164, one or more databases 166, and a network system 168. Web-hosting portal 160 is connected directly by wire to call center 170, or connected by phone lines to land network 144, which is connected to call center 170. In an example, web-hosting portal 160 is connected to call center 170 utilizing an IP network. In this example, both components, web-hosting portal 160 and call center 170, are connected to land network 144 utilizing the IP network. In another example, web-hosting portal 160 is connected to land network 144 by one or more data modems 162. Land network 144 sends digital data to and receives digital data from modem 162, data that is then transferred to web server 164. Modem 162 may reside inside web server 164. Land network 144 transmits data communications between web-hosting portal 160 and call center 170.

Web server 164 receives user-preference data from user computer 150 via land network 144. In alternative embodiments, computer 150 includes a wireless modem to send data to web-hosting portal 160 through a wireless communication network 142 and a land network 144. Data is received by land network 144 and sent to one or more web servers 164. In one embodiment, web server 164 is implemented as any suitable hardware and software capable of providing web services to help change and transmit personal preference settings from a client at computer 150 to telematics unit 120 in MVCU 110. Web server 164 sends to or receives from one or more databases 166 data transmissions via network system 168. Web server 164 includes computer applications and files for managing and storing personalization settings supplied by the client, such as door lock/unlock behavior, radio station preset selections, climate controls, custom button configurations, and theft alarm settings. For each client, the web server potentially stores hundreds of preferences for wireless vehicle communication, networking, maintenance, and diagnostic services for a mobile vehicle.

In one embodiment, one or more web servers 164 are networked via network system 168 to distribute user-preference data among its network components such as database 166. In an-example, database 166 is a part of or a separate computer from web server 164. Web server 164 sends data transmissions with user preferences to call center 170 through land network 144.

Call center 170 is a location where many calls are received and serviced at the same time, or where many calls are sent at the same time. In one embodiment, the call center is a telematics call center, facilitating communications to and from telematics unit 120 in MVCU 110. In an example, the call center is a voice call center, providing verbal communications between an advisor in the call center and a subscriber in a mobile vehicle. In another example, the call center contains each of these functions. In other embodiments, call center 170 and web-hosting portal 160 are located in the same or different facilities.

Call center 170 contains one or more voice and data switches 172, one or more communication services managers 174, one or more communication services databases 176, one or more communication services advisors 178, and one or more network systems 180.

Switch 172 of call center 170 connects to land network 144. Switch 172 transmits voice or data transmissions from call center 170, and receives voice or data transmissions from telematics unit 120 in MVCU 110 through wireless carrier system 140, communication network 142, and land network 144. Switch 172 receives data transmissions from and sends data transmissions to one or more web-hosting portals 160. Switch 172 receives data transmissions from or sends data transmissions to one or more communication services managers 174 via one or more network systems 180.

Communication services manager 174 is any suitable hardware and software capable of providing requested communication services to telematics unit 120 in MVCU 110. Communication services manager 174 sends to or receives from one or more communication services databases 176 data transmissions via network system 180. Communication services manager 174 sends to or receives from one or more communication services advisors 178 data transmissions via network system 180. Communication services database 176 sends to or receives from communication services advisor 178 data transmissions via network system 180. Communication services advisor 178 receives from or sends to switch 172 voice or data transmissions.

Communication services manager 174 provides one or more of a variety of services including initiating data over voice channel wireless communication, enrollment services, navigation assistance, directory assistance, roadside assistance, business or residential assistance, information services assistance, emergency assistance, and communications assistance. Communication services manager 174 receives service-preference requests for a variety of services from the client via computer 150, web-hosting portal 160, and land network 144. Communication services manager 174 transmits user-preference and other data such as, for example roadside assistance, vehicle updates, and the like to telematics unit 120 in MVCU 110 through wireless carrier system 140, communication network 142, land network 144, satellite broadcast system 146, voice and data switch 172, and network system 180. Communication services manager 174 stores or retrieves data and information from communication services database 176. Communication services manager 174 may provide requested information to communication services advisor 178.

In one embodiment, communication services advisor 178 is implemented as a real advisor. In an example, a real advisor is a human being in verbal communication with a user or subscriber (e.g., a client) in MVCU 110 via telematics unit 120. In another embodiment, communication services advisor 178 is implemented as a virtual advisor. In an example, a virtual advisor is implemented as a synthesized voice interface responding to requests from telematics unit 120 in MVCU 110. In another embodiment, the advisor 178 is an interactive voice response system (IVR).

Communication services advisor 178 provides services to telematics unit 120 in MVCU 110. Services provided by communication services advisor 178 include enrollment services, navigation assistance, directory assistance, roadside assistance, business or residential assistance, information services assistance, emergency assistance, automated vehicle diagnostic function, and communications assistance. Communication services advisor 178 communicates with telematics unit 120 in MVCU 110 through wireless carrier system 140, communication network 142, and land network 144 using voice transmissions, or through satellite broadcast system 146, communication services manager 174 and switch 172 using data transmissions. Switch 172 selects between voice transmissions and data transmissions.

In operation, an incoming call is routed to telematics unit 120 within mobile vehicle 110 from call center 170. In one embodiment, the call is routed to telematics unit 120 from call center 170 via land network 144, communication network 142, and wireless carrier system 140. In another embodiment, an outbound communication is routed to telematics unit 120 from call center 170 via land network 144, communication network 142, wireless carrier system 140 and satellite broadcast system 146. In this embodiment, an inbound communication is routed to call center 170 from telematics unit 120 via wireless carrier system 140, communication network 142, and land network 144.

Figure 2:
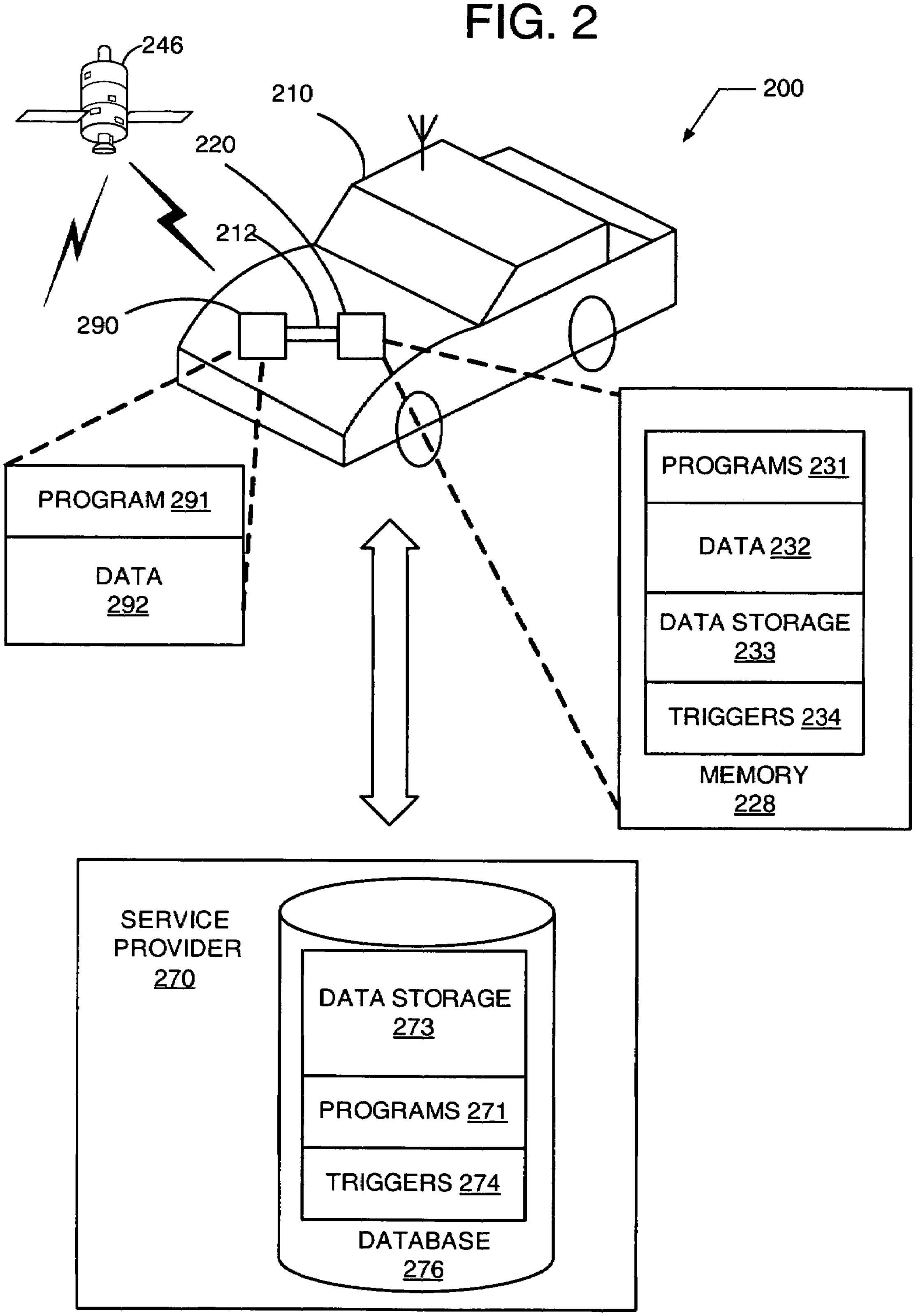
FIG. 2 is a block diagram of a telematics-based system in accordance with an embodiment of the present invention.

FIG. 2 is a block diagram of a telematics-based system in accordance with an embodiment of the present invention. FIG. 2 shows a telematics-based system 200 for operating a vehicle telematics device as a data collection and transmission device.

In FIG. 2, the telematics-based system 200 includes a mobile vehicle 210, satellite broadcast system 246, and a service provider 270. Mobile vehicle 210 includes a telematics unit 220 coupled to one or more vehicle system modules 290 via a vehicle communication network 212. Telematics unit 220 further includes a memory 228 that contains programs 231, program data 232, data storage 233, and triggers 234. One or more vehicle system modules (VSM) 290 are included within mobile vehicle 210 and each VSM 290 further includes a program 291 and data 292. In another embodiment, a VSM 290 within mobile vehicle 210 is located within telematics unit 220. In FIG. 2, the elements are presented for illustrative purposes and are not intended to be limiting. Telematics-based system 200 may include additional components not relevant to the present discussion.

Telematics unit 220 is any telematics device enabled for operation with a telematics service provider such as, for example, telematics unit 120 as described with reference to FIG. 1. Telematics unit 220 in vehicle 210 is in communication with a service provider (e.g., a "service center"). Telematics unit 220 includes volatile and non-volatile memory components for storing data and programs. In one embodiment, memory components in telematics unit 220 contains memory 228.

Memory 228 includes one or more programs 231 for operating telematics unit 220. For example, memory 228 includes a program for operating a vehicle telematics device to receive data collected from sensors, for operating a vehicle telematics device as a satellite signal receiver, and the like. In operation, program 231 executes loaded programs containing onboard instructions and/or received instructions and data in the form of onboard programming, a data stream from a service provider, commands from a user interface (not shown), and the like at data storage 233. In one embodiment, memory 228 includes a capacity to store telematics unit memory capacity information. The telematics unit memory capacity information includes a description of the physical memory addresses available for data storage.

In one embodiment, data storage 233 also contains vehicle identification information, such as, for example vehicle account information and the like. Program 231 executes the instructions, for example, by parsing the data stream/program instructions for additional instructions as well as data and triggers. In one embodiment, program 231 parses the data stream/program instructions and stores triggers at triggers 234. In this embodiment, program 231 transfers data to and receives data from VSM 290 for execution. In an example, program 231 parses the data stream/program instructions and determines current location information, such as, location information from a satellite broadcast system. In one embodiment, the location information is GPS information. In another example, program 231 receives vehicle diagnostic information from VSM 290 and transmits the vehicle diagnostic information to a service provider. In yet another example, program 231 receives vehicle diagnostic information from VSM 290 as well as GPS information and produces diagnostic information that is transmitted to a service provider. In another embodiment, program 231 is configured to detect the physical memory addresses available for data storage.

VSM 290 is any vehicle system control module having software and hardware components for operating, controlling, or monitoring one or more vehicle systems and sensors. In one embodiment, VSM 290 provides location information and is a global positioning system (GPS) module such as, for example, GPS unit 126 of FIG. 1. In another embodiment, VSM 290 is a control module for receiving sensor information and processing the received sensor information.

Vehicle system module 290 contains one or more processors, one or more memory devices, and one or more connection ports. In one embodiment, VSM 290 includes a software switch for scanning received satellite broadcast information, such as, for example GPS information, to identify that data has been received. VSM 290 is coupled to vehicle communication network 212 and, therefore, is coupled directly or indirectly to any other device that is also coupled to vehicle communication network 212. In an example, vehicle communication network 212 is a vehicle communication network 112 as described in FIG. 1, above. In one embodiment, VSM 290 is directly coupled to telematics unit 220 in primary mobile vehicle 210. In this embodiment, vehicle communication network 212 directly couples telematics unit 220 to vehicle system module 290. In another embodiment, VSM 290 is indirectly coupled to telematics unit 220.

In operation, when VSM 290 is implemented as a GPS receiver unit, program 291 operating within VSM 290 generates location information based on received GPS information and stores the generated location information at data 292. VSM 290 provides the location information to telematics unit 220 when required.

Satellite broadcast system 246 is any satellite broadcast system enabled for operation as a global positioning system (GPS) provider, such as, for example satellite broadcast system 146 as described with reference to FIG. 1. In one embodiment, satellite broadcast system 246 provides time based GPS information to a vehicle system module implemented as a GPS receiver.

Service provider 270 is any service center providing telematics services such as service center 170 described with reference to FIG. 1. In one embodiment, service provider 270 is enabled to concatenate and otherwise manage database 276 and includes hardware and software for managing database

276 as one or more data tables. In another embodiment, service center 270 is configured to access a database that is in another location but coupled to service center 270 such as, for example, database 166 in web server 160 as described in FIG. 1.

Database 276 contains one or more data tables stored at data storage 273 and trigger event data stored at triggers 274. In one embodiment, database 276 includes one or more programs 271 for managing one or more data tables by, for example, updating the one or more data tables and then providing the updated data tables to a telematics based system 200, such as, MVCS 100 of FIG. 1 above. In an example, trigger event data specifying conditions for providing updated data tables is located in triggers 274.

In illustrative operation, program 231 of telematics unit 220 receives a request for navigation instructions from a user interface (not shown). An example of a request for navigation instructions includes a user, through a user interface, providing destination information to telematics unit 220. Telematics unit 220 produces a navigation request and communicates the navigation request to service provider 270. The navigation request includes current location information of the telematics unit, destination information, and telematics unit memory capacity information. In one embodiment, the current location information of the telematics unit is provided by a vehicle system module (VSM) implemented as a GPS receiver unit. In an example, the current location information of telematics unit 220 is provided by a VSM 290 implemented as a GPS receiver unit. In one embodiment, the program is configured to determine storage capacity of the memory. In an example, program 231 is configured to detect the physical memory addresses available for data storage and produce telematics unit memory capacity information.

Service provider 270 receives the navigation request and produces navigation instructions based on the received navigation request. The navigation instructions include a plurality of data elements describing the navigation instructions. The amount of data elements included within the navigation instructions (described below in FIG. 3) is associated with the received telematics unit memory capacity information. The produced navigation instructions are then communicated to telematics unit 220.

Figure 3:
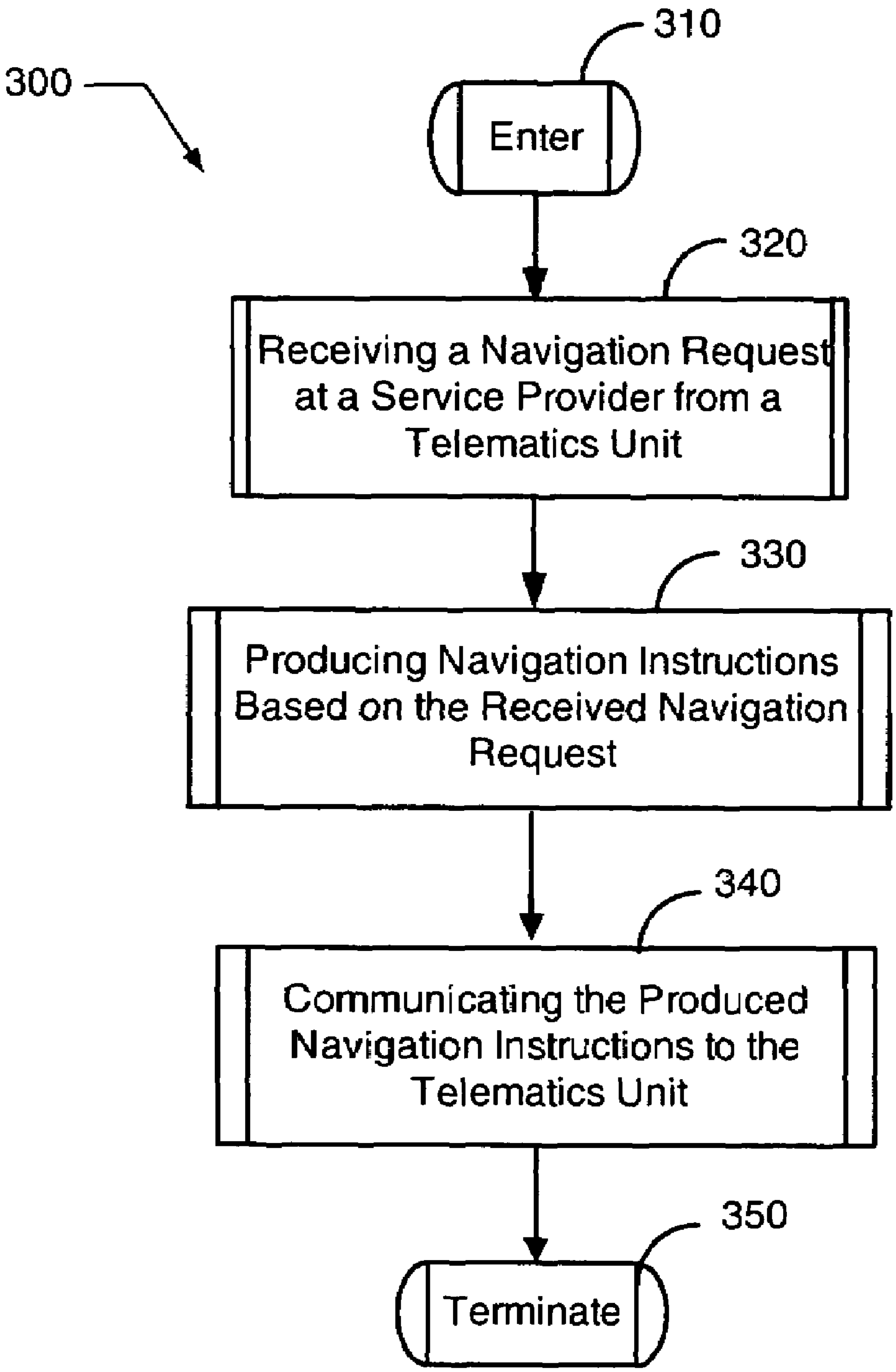
FIG. 3 is a flow diagram of one embodiment of a method of operating a vehicle telematics device, in accordance with the present invention.

FIG. 3 is a flow diagram of one embodiment of a method of operating a telematics enabled mobile vehicle communication system. In FIG. 3, method 300 may utilize one or more systems and concepts detailed in FIGS. 1 and 2, above. The present invention can also take the form of a computer usable medium including a computer program for operating a telematics enabled mobile vehicle communication system. The program stored in the computer usable medium includes computer program code for executing the method steps described in FIG. 3. In FIG. 3, method 300 begins at step 310.

At step 320, a navigation request is received at a service provider from a telematics unit. In an example, the navigation request is received at service provider 270 from a telematics unit 220. The navigation request includes current location information of the telematics unit, destination information, and telematics unit memory capacity information. In one embodiment, telematics unit memory capacity information describes the amount of physical memory addresses available for data storage.

At step 330, navigation instructions are produced based on the received navigation request. The navigation instructions provide directions from the current location of the telematics unit to the destination. The navigation instructions include a plurality of data elements describing the navigation instructions. The amount of data elements included within the navigation instructions is associated with the received telematics unit memory capacity information.

In one embodiment, producing navigation instructions based on the received navigation request includes generating a preliminary navigation instruction set. The preliminary navigation instruction set includes a navigation instruction set data size associated with the amount of data elements describing the preliminary navigation instructions. The embodiment further includes determining a data size capacity of the telematics unit. The data size capacity of the telematics unit is based on the telematics unit memory capacity information. The embodiment additionally includes comparing the data size capacity of the telematics unit to the preliminary navigation instruction set data size. When the preliminary navigation instruction set data size is less than the data size capacity of the telematics unit, the preliminary navigation instruction set is assigned as the navigation instructions. When the preliminary navigation instruction set data size is greater than the data size capacity of the telematics unit, a final navigation instruction set is produced based on the preliminary navigation instruction set. The final navigation instruction set is produced by prioritizing and modifying data elements describing the preliminary navigation instruction to produce the final navigation instruction set based on the priority. In one embodiment, the data size capacity is a file size capacity. Analysis of data size is known to those of skill in the art. In another embodiment, a pointer is assigned to access data, rather than a file handle.

Embodiments of the priorities include secondary street names, after maneuver names, street name changes that do not change direction, destination address, compound names, street suffixes, interstate prefixes, and street names with directions. As used herein, a secondary street name is an alternate name for a road other than its primary legal name. An example of a secondary street name modification includes modifying "US-24, Telegraph Rd" to "US-24." In another example, Sixth Avenue in New York City has a secondary street name as Avenue of America. In Chicago, Ill., Addison Street has a secondary street name and is also known colloquially as 3600 North. As used herein, an after maneuver names modification includes a post maneuver names modification. As used herein, an after maneuver names modification delineates a change in the name of the street upon which a driver is traveling. If a road has multiple name changes, the after maneuver name changes monitors the name for the road upon which the driver is currently traveling and uses that current name for navigation, while continuing to monitor any other names for the current road. An example of after maneuver names modification includes modifying "Continue on Maple Rd. for 1.2 miles" to "Continue for 1.2 miles." An example of street name changes that do not change direction modification includes the removal of the entry, such as, removal of "Rochester Road becomes Main St." An example of destination address modification includes replacing the destination address with "Your Destination." An example of compound names modification includes modifying "I-96/I-696" to "I-96." An example of street suffixes modification includes the removal of the street suffix, such as, modifying "Maple Road" to "Maple." An example of interstate prefixes modification includes the removal of the prefix, such as, modifying "I-75" to "75." An example of street names with directions modification includes removal of the street name and replacement of the street name with a distance, such as, modifying "Turn left onto Main St." to "Turn left in 1.4 miles."

For example, in the metropolitan Detroit area, 16 Mile Road is alternatively known as Big Beaver Road and Metropolitan Parkway. As a driver travels upon 16 Mile Road eastbound, the name changes depending on the driver location and municipality or county. Thus, the name of the road changes from 16 Mile Road to Big Beaver Road to Metropolitan Parkway. Each road name is maintained in the navigation system, and the driver is supplied the name of the road for the drivers current location.

In one embodiment, prioritization of modification of data elements within the preliminary navigation instruction set is subject to modification. In an example, the prioritization of modification of data elements within the preliminary navigation instruction set is based on a manufacturer provided priority list. In another example, the prioritization of modification of data elements within the preliminary navigation instruction set is based on user preferences.

In another embodiment, producing navigation instructions based on the received navigation request includes determining a data size capacity of the telematics unit based on telematics unit memory capacity information. The embodiment further includes generating a navigation instruction set based on the determined data size capacity of the telematics unit. The navigation instruction set includes a navigation instruction set data size associated with the amount of data elements describing the navigation instructions. The navigation instruction set is generated so that the navigation instruction set data size is less than the data size capacity of the telematics unit. In another embodiment, generating the navigation instruction so that the navigation instruction set data size is less than the data size capacity of the telematics unit includes prioritizing and modifying data elements within the navigation instruction set based on the priority.

Embodiments of the priorities include secondary street names, after maneuver names, street name changes that do not change direction, destination address, compound names, street suffixes, interstate prefixes, street names with directions. Examples of the priorities are described above. In one embodiment, prioritization of modification of data elements within the preliminary navigation instruction set is subject to modification. In an example, the prioritization of modification of data elements within the preliminary navigation instruction set is based on a manufacturer provided priority list. In another example, the prioritization of modification of data elements within the preliminary navigation instruction set is based on user preferences.

At step 340, the produced navigation instructions are communicated to the telematics unit. In one embodiment, the produced navigation instructions are communicated from the service provider to the telematics unit. In an example, the produced navigation instructions are communicated from service provider 270 to the telematics unit 220.

At step 360, the method is terminated.

In another embodiment, method 300 may further include providing the produced navigation instructions to a user interface. In an example, method 300 may further include telematics unit 220 providing the produced navigation instructions to a user interface (not shown).

In yet another embodiment, method 300 may further include receiving a request at the service provider from the telematics unit to modify the navigation instructions. In an example, such a request occurs when additional memory is directed away from a navigation assistance program to another program, such as a user communication program. In this embodiment, the request includes the navigation instructions that have not been provided to the user interface and updated telematics unit memory capacity information. The updated telematics unit memory capacity information describes the updated amount of physical memory addresses available for data storage. The embodiment further includes producing modified navigation instructions based on the received request to modify the navigation instructions. The modified navigation instructions provide directions from the current location of the telematics unit to the destination. The modified navigation instructions include a plurality of data elements describing the navigation instructions. The amount of data elements included within the modified navigation instructions is associated with the received updated telematics unit memory capacity information. The embodiment additionally includes communicating the modified navigation instructions to the telematics unit.

The above-described methods and implementation for operating a telematics enabled mobile vehicle communication system are example methods and implementations. These methods and implementations illustrate one possible approach for operating a telematics enabled mobile vehicle communication system. The actual implementation may vary from the method discussed. Moreover, various other improvements and modifications to this invention may occur to those skilled in the art, and those improvements and modifications will fall within the scope of this invention as set forth in the claims below.

The present invention may be embodied in other specific forms without departing from its spirit or essential characteristics. The described embodiments are to be considered in all respects only as illustrative and not restrictive.

What is claimed is:

1. A method of operating a mobile vehicle communication system, comprising the steps of:

(a) receiving a navigation request at a service provider, wherein the navigation request includes information regarding a current vehicle location, a desired vehicle destination, and a vehicle telematics unit memory capacity;

(b) generating preliminary navigation instructions that generally provide directions for a route extending from the current vehicle location to the desired vehicle destination, wherein the preliminary navigation instructions include a plurality of data elements that each describes a different aspect of the route and has a predetermined priority;

(c) producing modified navigation instructions by modifying one or more of the data elements according to its predetermined priority if the data size associated with the preliminary navigation instructions exceeds the vehicle telematics unit memory capacity; and (d) communicating the modified navigation instructions to the vehicle telematics unit in a single transmission, wherein the plurality of data elements includes elements selected from the group consisting of: secondary street names, after maneuver names, street name changes that do not change direction, destination address, compound names, street suffixes, interstate prefixes, and street names with directions.

2. The method of claim 1, wherein the predetermined priority for each data element is based on user preferences.

3. The method of claim 1, wherein the predetermined priority for each data element is based on information provided by the manufacturer of the vehicle telematics unit.

4. A method of operating a mobile vehicle communication system, comprising the steps of:

(a) receiving a navigation request at a service provider, wherein the navigation request includes information regarding a current vehicle location, a desired vehicle destination, and a vehicle telematics unit memory capacity;

(b) generating navigation instructions that generally provide directions for a route extending from the current vehicle location to the desired vehicle destination, wherein the navigation instructions include a plurality of data elements that each describes a different aspect of the route and has a predetermined priority, and wherein during generation of the navigation instructions, the selection of each of the data elements is based on its predetermined priority so that the data size associated with the navigation instructions does not exceed the vehicle telematics unit memory capacity; and (c) communicating the navigation instructions to the vehicle telematics unit in a single transmission, wherein the plurality of data elements includes elements selected from the group consisting of: secondary street names, after maneuver names, street name changes that do not change direction, destination address, compound names, street suffixes, interstate prefixes, and street names with directions.

5. The method of claim 4, wherein the predetermined priority for each data element is based on user preferences.

6. The method of claim 4, wherein the predetermined priority for each data element is based on information provided by the manufacturer of the vehicle telematics unit.

* * * * *